United States Patent Office 3,605,873
Patented Sept. 20, 1971

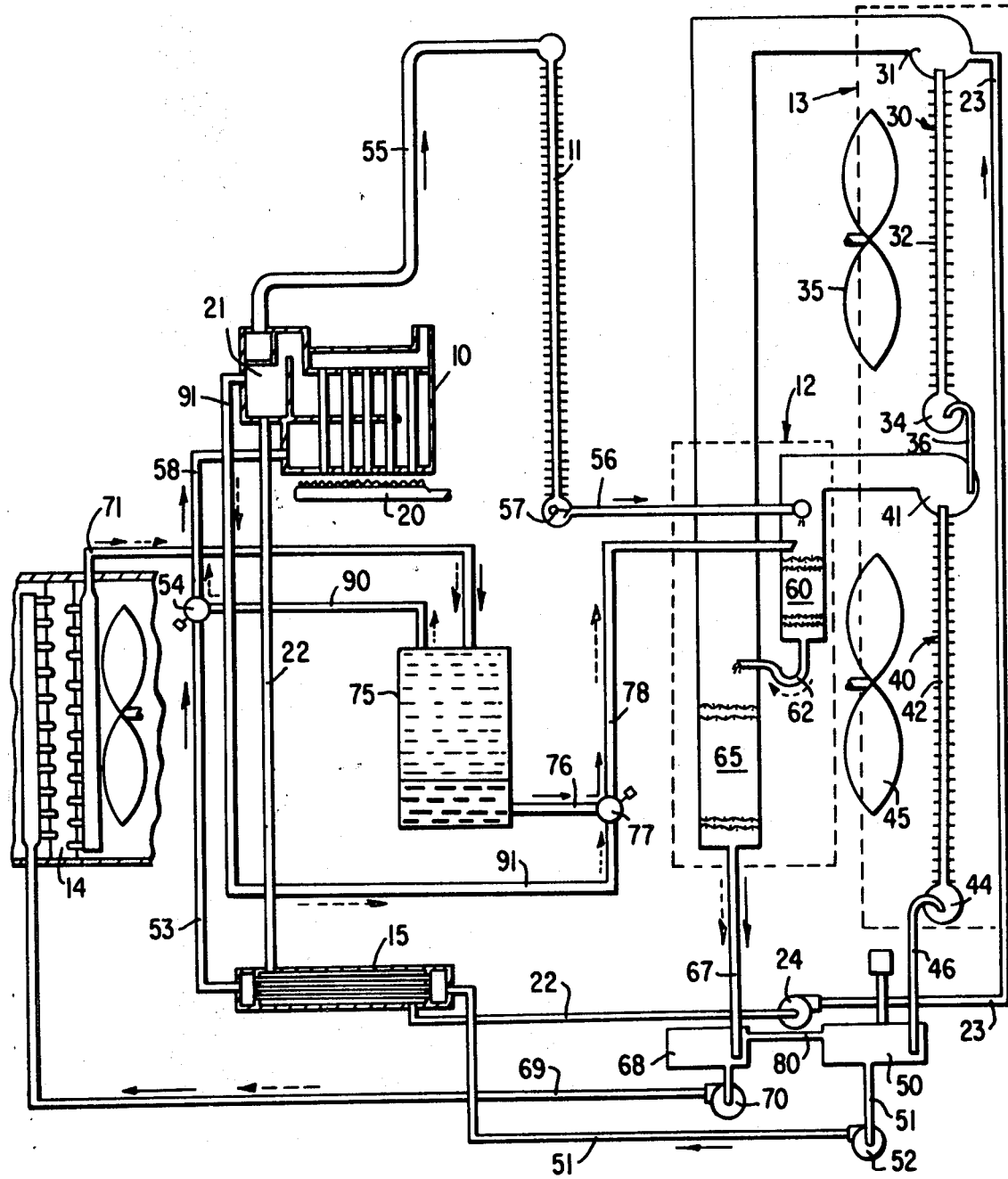

3,605,873
HEATING AND COOLING SYSTEM
Louis H. Leonard, Jr., Dewitt, N.Y., assignor to
Carrier Corporation, Syracuse, N.Y.
Filed Mar. 30, 1970, Ser. No. 23,655
Int. Cl. F25b *15/06*
U.S. Cl. 165—2                                                 11 Claims

ABSTRACT OF THE DISCLOSURE

An absorption refrigeration system is provided with an excess quantity of octyl alcohol heat exchange additive. A separation tank is provided which stores the alcohol when the system is operating in the cooling mode. In the heating mode, the alcohol is discharged from the separation tank, heated in the generator, and passed through an air-conditioning coil to provide heating to a desired location. Means are provided for mixing absorbent solution and refrigerant to form a dilute mixture which will not freeze when stored in the system during heating mode operation.

BACKGROUND OF THE INVENTION

This invention relates to heating and cooling systems and more particularly to an absorption refrigeration system having a cooling mode and a heating mode of operation.

Prior proposals for adding a heating system to an absorption refrigeration machine have usually involved either condensing refrigerant in a condenser to provide heating, such as a reverse cycle operation. These systems have not been entirely satisfactory for a number of reasons. In a reverse cycle system, the heating capacity is generally limited by the refrigeration capacity of the system, and in many applications, this provides insufficient heat without the use of some type of auxiliary heating mechanism. In addition, all condensation heat rejection systems require that the machine be effectively purged during winter operation to obtain heating. Also, it is necessary to heat absorbent solution in the generator to a temperature well above the condensing temperature in the system in order to boil off refrigerant vapor which accelerates corrosion and reduces the efficiency of the prior heating cycles. Furthermore, where water is utilized as a refrigerant, there is a serious danger of water vaporizing from diluted absorbent solution and condensing or freezing either on condensing surfaces or elsewhere in the system, thereby causing serious heat loss or damage to the machine. The use of separate heating fluids in an absorption refrigeration machine has generally been thought impractical because their vapor pressure results in adverse cooling cycle performance and they may be miscible in absorbent or refrigerant seriously affecting their physical or chemical properties.

SUMMARY OF THE INVENTION

An absorption refrigeration system is provided with means such as a separation tank which is capable of separating absorbent solution, such as aqueous lithium bromide, from an additive, such as octyl alcohol, which has a relatively low vapor pressure compared to that of the refrigerant and absorbent solution. During heating mode operation, the absorbent solution and refrigerant in the system are mixed together and passed to the separation tank. The additive is withdrawn from the separation tank, passed to the generator, where it is heated and then passed to a heat exchanger for providing heat to a desired location. During cooling mode operation, the additive is passed to the separation tank and refrigerant and absorbent mixture is withdrawn from the tank to provide cooling operation of the absorption refrigeration system. The vapor pressure of the additive is sufficiently low so that it does not impair cooling cycle performance and in the case of the preferred additive, octyl alcohol, it actually improves the cooling capacity of the system. Further, octyl alcohol has the remarkable property of lowering the vapor pressure of a lithium bromide solution so that the undesirable tendency for the refrigerant to vaporize from the stored absorbent-refrigerant mixture during the heating cycle is greatly reduced.

BRIEF DESCRIPTION OF THE DRAWING

The drawing is a schematic illustration, partially in cross section, of a heating and cooling system in accordance with this invention, wherein solid arrows indicate fluid flow in the cooling mode of operation and broken line arrows indicate fluid flow in the heating mode of operation of the system.

DESCRIPTION OF THE PREFERRED EMBODIMENT

For purposes of illustration, this invention will be described with respect to a heating and an air-cooled, multistage absorption cooling system wherein water is the refrigerant, an aqueous solution of lithium bromide is utilized as an absorbent solution, and octyl alcohol (2-ethyl-n-hexanol) is used as an additive. A concentrated solution of absorbent which is strong in absorbing power will be referred to as "strong solution" and a dilute solution of absorbent, weak in absorbing power, will be referred to as "weak solution." Octyl alcohol is the preferred additive because it is relatively immiscible with water and lithium bromide, has a substantially different specific gravity, improves the cooling capacity of the system and does not adversely affect the absorbent or refrigerant properties. It will also be appreciated that the invention may be utilized with single-stage or other types of multi-stage air or liquid cooled absorption refrigeration systems. Various other absorbent-refrigeration combinations, including water and ammonia, may be employed instead of the preferred combination and other low vapor pressure, relatively immiscible additives may be used.

COOLING MODE OPERATION

Referring particularly to the drawing, the absorption refrigeration system comprises a generator 10, a condenser 11, a two-stage evaporator 12, a two-stage absorber 13, an air-conditioning load heat exchanger 14 and a solution heat exchanger 15.

Generator 10 is heated by a suitable heat source such as gas burner 20, although a steam or hot water heated generator may be utilized if desired. Weak absorbent solution is boiled in generator 10 to drive off refrigerant vapor and to concentrate the remaining solution. The refrigerant vapor and strong solution are passed to separating chamber 21 from which the separated strong solution passes through strong solution passage 22, the outside passage of solution heat exchanger 15, and is pumped by strong solution pump 24 through strong solution passage 23 to the top of absorber 13.

The strong solution enters a low pressure absorber stage 30 of absorber 13 at upper vapor header 31 thereof. Low pressure absorber stage 30 comprises, in the illustrated embodiment, an absorber heat exchanger having vertical absorber heat exchange tubes 32. Fan 35 passes ambient cooling air over the exterior surface of the absorber tubes 32 to cool the absorbent solution therein. The upper ends of absorber tubes 32 extend into vapor header 31 and the lower ends of the absorber tubes drain into lower liquid header 34. The strong absorbent solution entering vapor header 31 overflows the ends of the absorber tubes 32 and drains downwardly therethrough along their interior surface and absorbs refrigerant vapor until reaching liquid header 34. The absorbent solution, having absorbed some refrigerant vapor, then passes through intermediate strength solution passage 36 into upper liquid header 41 of high pressure absorber stage 40.

High pressure absorber stage 40 similarly comprises an upper liquid header 41, a plurality of absorber heat exchange tubes 42 and a lower liquid header 44 joining the heat exchange tubes at their lower ends. Fan 45 passes ambient air over the exterior surfaces of absorber tubes 42 to cool absorbent solution therein. Intermediate strength solution overflows the top of absorber tubes 42 and passes downwardly therethrough along the interior surface while absorbing additional refrigerant vapor.

The weakened absorbent solution is collected in liquid header 44 and passes through weak solution passage 46 into weak solution sump 50. The weak absorbent solution is forwarded through weak solution passage 51 by a weak solution pump 52 through the interior passage of solution heat exchanger 15 from which it passes through weak solution passage 53, valve 54 and passage 58 to generator 10 for reconcentration.

The refrigerant vapor which is separated from absorbent solution boiled in generator 10 passes through refrigerant vapor passage 55 to condenser 11. Air or other cooling medium is passed over the exterior surface of condenser 11 to cool and condense the refrigerant vapor. Liquid refrigerant is collected in the lower header of condenser 11 and passes through float valve 57 and refrigerant liquid passage 56 into high temperature evaporator stage 60 of evaporator 12.

A portion of the liquid refrigerant is evaporated as it passes through the extended heat transfer surface, such as wire gauze, in high temperature evaporator stage 60. The vaporized portion of the refrigerant passes from evaporator stage 60 into vapor header 41 of high pressure absorber stage 40. The remaining cooled liquid refrigerant passes through refrigerant passage 62 into low temperature evaporator stage 65 where it is again partially evaporated and the remainder of the liquid refrigerant is further cooled. The refrigerant vapor formed in low temperature evaporator stage 65 passes to vapor header 31 of low pressure absorber stage 30. The remaining cold liquid refrigerant passes through refrigerant liquid passage 67 into refrigerant sump 68. The cold refrigerant is forwarded from refrigerant sump 68 through refrigerant passage 69 by refrigerant pump 70 to air-conditioning load heat exchanger 14. Air or other medium to be cooled is passed in heat exchange relation with the cold refrigerant in heat exchanger 14 to provide the desired cooling effect. The liquid refrigerant leaving air-conditioning heat exchanger 14 passes through refrigerant liquid passage 71 and through the alcohol in separation tank 75, back to high temperature exaporator stage 60 for recooling. Because of the difference in specific gravities, most of the alcohol remains in tank 75 and the small amount carried out by the refrigerant improves the cooling capacity of the system. Any absorbent in the tank is leached out by the refrigerant so the tank can be located in a place where it may receive solution from the system.

A vapor pressure control passage 80 extends between absorbent sump 50 and refrigerant sump 68. If the ambient temperature of air passed over absorber 13 and condenser 11 drops, the increased absorption of water vapor will cause the level of weak solution in sump 50 to rise, pass through passage 80, and mix with refrigerant in sump 68. Eventually cool weather operation of the refrigeration system will cause substantial mixing of absorbent with refrigerant throughout the entire system so that a dilute mixture is created having a freezing temperature which is relatively low compared to the freezing temperature of either pure refrigerant or concentrated absorbent solution. This mixture is therefore capable of remaining stored at any location in the system during cold weather operation without solidifying under normally encountered conditions.

Conversely, when the ambient temperature rises, the decreased absorption of refrigerant in absorber 13 and the increased quantity of refrigerant driven off in generator 10 will cause the level of liquid in sump 68 to rise, and pass through passage 80 into absorbent sump 50. The bleeding of refrigerant, having some absorbent therein, into absorbent sump 50 and replacement of the liquid with pure refrigerant from condenser 11 will continue until the liquid in the refrigerant circuit is substantially pure water.

HEATING MODE OPERATION

When it is desired to switch from heating to cooling mode operation, the operation of strong solution pump 24 and weak solution pump 52 is terminated. Three-way valve 54 is switched into a position so that passage 58 is connected to a heating passage 90 and three-way valve 77 is switched to a position so that passage 78 is connected to a heating passage 91. In the event that the system has not been operating at a sufficiently low ambient temperature to assure good mixing of the absorbent with refrigerant throughout the system, termination of operation of pump 52 and switching of valve 54 may be delayed for a period of time, so that sump 50 is drained of absorbent solution which is then passed to generator 10, and from there through passage 91 into evaporator 12 and evaporator sump 68 where it is completely mixed with refrigerant.

In the heating mode of operation, pump 70 passes liquid through load heat exchanger 14 and passage 71 into separation tank 75. The relatively much heavier dilute solution of absorbent and refrigerant gravitationally separates from the additive in the separation tank and accumulates at the bottom of the tank. The mixture has a very low freezing point so low ambient temperatures present no problem. The relatively lighter heat exchange additive is forced out of tank 75 through passages 90 and 58 into generator 10. The alcohol heat exchange additive is heated in generator 10 and drains by gravity out of the generator through passages 91 and 78 into evaporator 12. The heated additive passes from stage 60 through passage 62 and stage 65 out of evaporator 12 through passage 67 into sump 68. From sump 68, the hot additive is passed by pump 70 through passage 69 to load heat exchanger 14 where air to be heated is passed in heat exchange relation with the hot additive. The additive then passes from heat exchanger 14 through passage 71 back to separation tank 75 from which it is returned to the generator for reheating. It happens that the viscosity of the alcohol in equilibrium with the dilute refrigerant-absorbent mixture on the heating cycle is much lower than if the alcohol were in equilibrium with stronger solution so that the alcohol additive is easily pumped in the system.

It will be seen that during winter operation, most of the absorbent solution and refrigerant in the system will accumulate in separation tank 75 while the separated additive will pass out of the tank for circulation in the system. Conversely, during cooling mode operation, separated additive will accumulate in separation tank 75 while refrigerant and/or absorbent solution separated therefrom will pass through passage 76 into circulation in the absorption refrigeration system. The small quantity of alcohol additive dissolved in the absorbent will increase heat transfer and improve refrigeration capacity of the system.

The dilute mixture of absorbent solution and refrigerant passing out of separation tank 75 after switching to cooling mode operation will be accumulated in sump 68 and a portion thereof will be continuously bled into sump 50 until the absorbent comcentration in the refrigerant circuit has reduced to a point that the machine is able to provide the full capacity demanded of it, at which time, the level in sump 68 will drop below the level of passage 80 and the bleeding of refrigerant to the absorbent circuit will be stopped.

While the preferred embodiment of this invention utilizes a single load heat exchange means to selectively provide both heating and cooling to a desired location, it will be appreciated that the load heat exchange means may comprise separate heating and cooling heat exchangers operating either selectively or simultaneously, for heating air or liquid, as desired in one or more locations. Furthermore, the separation tank illustrated may be suitably modified or relocated in the system in any way so that it releases the additive during heating mode operation but may be either operative or inoperative to store liquid additive during cooling mode operation. In addition, while adiabatic evaporators are preferred for supplying chilled water to a combined heating-cooling load heat exchanger, direct expansion or other types of refrigerant evaporators, wherein the cooling load heat exchanger is located in or as a part of the evaporator, heat exchanger is located in or as a part of the evaporator, may be utilized. While valve means have been shown to switch between heating and cooling, it is possible to use seal loops or other means.

It is preferred to mix absorbent solution with a refrigerant during heating mode operation and to provide means for separating the absorbent and refrigerant during cooling mode operation, so as to allow location of the system in low ambient temperature locations without endangering any part of the system from freezing. However, it is also feasible to utilize the heat transfer additive for heating mode operation in more conventional systems of a type which do not mix the absorbent and refrigerant when heating is required.

The alternate embodiments of this invention suggested above make the invention applicable to any type of absorption refrigeration system by selection of a suitable additive and by suitably locating and constructing separation means to provide the described functions. However, a highly important advantage and feature of the system described is the ease with which the invention is readily adaptable to a conventional lithium bromide-water absorption refrigeration system to provide heating therefrom. 2-ethyl-n-hexanol has the remarkable property of improving cooling cycle capacity and efficiency, while not deleteriously affecting the absorbent or refrigeration properties. It also has a substantially different specific gravity than that of either water or absorbent, and consequently can be easily separated from either or both or from any mixtures of refrigerant and absorbent. Further, the octyl alcohol will not become excessively viscous when in equilibrium with a dilute refrigerant-absorbent mixture and a small amount of octyl alcohol will dissolve in the absorbent or refrigerant to increase the refrigeration capacity of the system. In addition, the octyl alcohol has a very low vapor pressure and the small quantity thereof, which dissolves in absorbent solution further lowers the vapor pressure of the absorbent solution which prevents refrigerant from being boiled out of the solution during heating cycle operation. Thus, the presence of additive in the system not only serves as a heating fluid or heat transfer medium, but it also prevents water from condensing out in locations where it would cause a loss of heat and might freeze and cause damage to the machine. For these reasons, the specific combination of water as a refrigerant, aqueous lithium bromide as an absorbent, and octyl alcohol as an additive possesses unexpectedly and inexplicably desirable properties when used in combination with each other to provide a heating and cooling system which overcomes the major shortcomings of prior proposals for producing heating from an absorption system.

Accordingly, it will be appreciated that while a preferred embodiment of this invention is described for purposes of illustration, the invention may be otherwise embodied.

I claim:

1. A heating and cooling system adapted to contain a liquid refrigerant, a liquid absorbent solution and a relatively immiscible liquid additive, said system comprising:
   (A) a generator for heating liquid supplied thereto;
   (B) a condenser for condensing refrigerant vapor supplied thereto from the generator;
   (C) an evaporator for evaporating refrigerant supplied thereto from the condenser;
   (D) an absorber for absorbing refrigerant vapor from the evaporator into absorbent solution supplied thereto from the generator;
   (E) load heat exchange means for providing heating and cooling;
   (F) passage means for circulating refrigerant and absorbent solution in the system and providing cooling to a desired location when said system is in a cooling mode of operation; and
   (G) passage means for passing heated liquid additive from the generator to said load heat exchange means for heating a desired location, and from said load heat exchange means back to said generator for reheating therein when said system is in a heating mode of operation.

2. A heating and cooling system as defined in claim 1 wherein said system includes separation means for separating liquid additive from at least one of the other liquids in the system, said separation means including storage means for storing liquid additive when the system is providing cooling and for storing said other liquid when the system is providing heating.

3. An aborption refrigeration system as defined in claim 1 wherein said system includes a separation tank for gravitationally separating liquid additive from at least one of the other liquids in said system, said separation tank further comprising storage means for storing liquid additive when said system is in a cooling mode of operation and for storing said other liquid when said system is in a heating mode of operation; passage means opening into said tank adjacent one end thereof for passing said other liquid from said separation means for circulation in said system when the system is in a cooling mode of operation, and passage means opening into said tank adjacent the other end thereof for passing said liquid additive from said separation means for circulation in said system when the system is in a heating mode of operation.

4. A heating and cooling system as defined in claim 1 wherein said rifregerant comprises water, said absorbent solution comprises lithium bromide, and said additive comprises 2-ethyl-n-hexanol.

5. A heating and cooling system as defined in claim 1 including:
   (A) a separation and storage tank disposed in said system for storing refrigerant and absorbent solution during heating mode operation of said system and for storing additive during cooling mode operation thereof; and
   (B) passage means for passing one of the other liquids in the system through said tank in contact with liquid additive therein during cooling mode operation of said system.

6. A heating and cooling system as defined in claim 1 wherein said refrigerant comprises water, said absorbent solution comprises lithium bromide, and said additive comprises 2-ethyl-n-hexanol, said system including:
   (A) passage means operative upon low temperature operation of said system for mixing liquid refrigerant with absorbent solution to form a dilute solution of absorbent and refrigerant having a relatively low freezing temperature;
   (B) separation and storage means comprising a separation tank for gravitationally separating liquid additive from the dilute solution of absorbent and refrigerant;

(C) control means for selecting either cooling mode operation or heating mode operation of said system;

(D) passage means operative on the heating mode of operation of said system to pass the dilute solution of absorbent and refrigerant into said separation tank and for removing stored liquid additive therefrom, and passage means for passing the additive into circulation in said system to provide heating and for returning the liquid additive to said separation tank during heating mode operation of the system; and (E) passage means operative on the cooling mode of operation of said system for passing liquid additive to said separation tank, passage means for removing the stored dilute solution of absorbent and refrigerant therefrom and for passing the dilute solution into circulation in said system to provide cooling, and passage means for passing one of the other liquids in the system through said separation tank for contact with the stored liquid additive therein during cooling mode operation of the system.

7. A method of operating a heating and cooling system including a generator, a condenser, an evaporator, an absorber, a load heat exchange means, a refrigerant, an absorbent solution, and a relatively immiscible, liquid additive, including the steps of:

(A) providing cooling when the system is operating in the cooling mode by boiling absorbent solution in the generator to concentrate it by driving off refrigerant vapor, condensing refrigerant vapor produced in the generator, evaporating liquid refrigerant condensed in the condenser in heat exchange relation with a fluid passing through the load heat exchange means to provide refrigeration, and absorbing refrigerant vapor produced in the evaporator into absorbent solution in the absorber; and (B) providing heating when the system is operating in the heating mode by heating the relatively immiscible liquid additive in the generator, passing heated liquid additive from the generator in heat exchange relation with a fluid passing through the load heat exchange means to provide heating, and returning the liquid additive to the generator for reheating.

8. A method of operating a heating and cooling system as defined in claim 7 which includes separating the liquid additive from the other liquids in the system, and storing the separated liquid additive when the system is operating in the cooling mode.

9. A method of operating a heating and cooling system as defined in claim 7 which includes separating the liquid additive from the other liquids in the system, storing the separating liquid additive when the system is operating in the cooling mode, and storing said other liquid when the system is operating in the heating mode.

10. A method of operating a heating and cooling system as defined in claim 7 which includes the steps of mixing absorbent solution and liquid refrigerant to form a dilute mixture having a relatively low freezing temperature and storing said mixture in a separation region when operating said system in the heating mode; and separating the liquid additive from the other liquids in the system and storing the additive in said separation zone when operating the system in the cooling mode.

11. A method of operating a heating and cooling system as defined in claim 7 wherein said system includes a separation tank, said method including passing a mixture of liquid additive and other liquid to said separation tank, gravitationally separating said mixture of liquids, storing said liquid additive in said separation tank and passing said other liquid through said storage tank in contact with the separated additive therein and into circulation in the system during cooling mode operation thereof; and passing a mixture of additive and other liquid to said separation tank, separating said mixture of liquids, storing said other liquid in said separation tank, and passing said liquid additive through said separation tank in contact with the separated liquid and into circulation in the system during heating mode operation thereof.

References Cited

UNITED STATES PATENTS 2,814,468  11/1957  Berry _____ 165—62
3,536,130  10/1970  Leonard, Jr. _____ 165—2

WILLIAM F. O'DEA, Primary Examiner

P. D. FERGUSON, Assistant Examiner

U.S. Cl. X.R.
62—476; 165—62